United States Patent [19]
Rich

[11] Patent Number: 6,031,355
[45] Date of Patent: Feb. 29, 2000

[54] CIRCUIT UTILIZING CURRENT FLOWING FROM A HIGH-POTENTIAL BATTERY BANK TO A LOW-POTENTIAL BATTERY BANK

[76] Inventor: Joe G. Rich, 17141 NW 2nd Ct., Miami, Fla. 33169-5995

[21] Appl. No.: 09/134,772

[22] Filed: Aug. 15, 1998

Related U.S. Application Data

[60] Provisional application No. 60/062,008, Oct. 17, 1997, and provisional application No. 60/057,041, Aug. 16, 1997.

[51] Int. Cl.[7] .................................................. H01M 10/46
[52] U.S. Cl. .......................................... 320/117; 320/121
[58] Field of Search .................................. 320/112, 103, 320/116, 117, 118, 121, 123

[56] References Cited

U.S. PATENT DOCUMENTS

| | | | |
|---|---|---|---|
| 3,718,848 | 2/1973 | Hines | 320/117 |
| 5,233,282 | 8/1993 | Iwashita | 320/117 |
| 5,592,067 | 1/1997 | Peter et al. | 320/118 X |
| 5,631,534 | 5/1997 | Lewis | 320/118 X |
| 5,710,504 | 1/1998 | Pascual et al. | 320/118 X |
| 5,734,205 | 3/1998 | Okamura et al. | 320/117 X |
| 5,814,970 | 9/1998 | Schmidt | 320/118 |
| 5,867,007 | 2/1999 | Kim | 320/118 |

FOREIGN PATENT DOCUMENTS

| | | |
|---|---|---|
| 879684 | 11/1981 | Sweden . |
| 240658 | 10/1924 | United Kingdom . |
| 2089592 | 6/1982 | United Kingdom . |

Primary Examiner—Edward H. Tso
Attorney, Agent, or Firm—Robert M. Schwartz

[57] ABSTRACT

The invention encompasses a circuit that is capable of driving a load with the current as electrons flow during equilibration from a high-potential battery bank to a low-potential bank. The cells comprising each battery bank can be switched from being in parallel to each other to being in series; this switch causes the potential of each battery bank to change and thereby creates a relative potential difference between the cells. By switching the battery banks so that one bank is parallel and the other is serial, allowing the battery banks to equilibrate, and then switching the cells in the battery banks after equilibration from parallel to serial and serial to parallel, a potential difference can be recreated repeatedly and current flow maintained.

9 Claims, 6 Drawing Sheets

CIRCUIT UTILIZING CURRENT FLOWING FROM A HIGH-POTENTIAL BATTERY BANK TO A LOW-POTENTIAL BATTERY BANK

CROSS-REFERENCES TO RELATED APPLICATIONS

This application claims the benefit of U.S. Provisional Application No. 60/062,008, filed Oct. 17, 1997, and U.S. Provisional Application 60/057,041, filed Aug. 16, 1997.

BACKGROUND OF THE INVENTION

1. Field of the Invention

The field of the invention is battery-powered electric motors and alternators. More specifically, the invention relates to electric motors and charging in battery-powered vehicles. The invention encompasses a battery system capable of producing a ping-pong electron effect. The invention encompasses a battery-powered motor that is usable in a battery-powered vehicle. The invention also encompasses an apparatus for charging such batteries.

2. Description of the Related Art Including Information Disclosed Under 37 CFR 1.97 and 1.98

Changes in regulations have brought the concept of battery-powered cars to the forefront.

First, the electric power industry is deregulating. Consumers of electricity are no longer held to the local utility company as they once were. As a result, electricity providers are now able to price shop for electrical power. Evidence of this market is the creation of a futures market in electricity. The ultimate result should be market-driven pricing of electricity. Market prices should be lower than the monopoly-prices previously charged by local power companies.

An indirect result of a drop in power prices, should be an increased incentive to use electricity for power compared to other fuels. Specifically, the drop in costs of electricity, should increase the incentive to use electric cars compared.

Another regulation that has increased the incentive for battery-powered cars is the California Air Resources Board regulation for the introduction of zero-emissions vehicles. According to these regulations, car manufacturers were to make at least ten percent of their cars with batter-powered motors. In addition, to create a support system for these new cars, the states of California and Arizona have required a network of charging stations be created. These charging stations make it possible for electric cars to move around the states and refuel.

Despite the incentives provided by these regulations, battery-powered cars have not replaced gasoline-powered automobiles. Evidence of the impracticability of day-to-day use of electric cars has been the automobile industry's failure to meet the California Air Resources Board regulation for the introduction of zero-emissions vehicles. Faced with the reality that only two manufacturers were able to produce commercially-viable, battery-powered automobiles that could meet these standards, California allowed the standard to languish.

Existing battery-powered cars have numerous shortcomings. First, the battery's charge capacity is limited. A limited charge limits the distance that a battery-powered car can travel. In addition, a limited charge limits the horsepower that the motor can generate. As a result, battery-powered cars in the prior art can only travel short distances and performance suffers during those trips as the cars try to climb steep hills and accelerate in tough traffic.

To solve these problems, electric-car manufacturers have tried to use larger-capacity batteries within their cars. While the newer batteries have improved performance, this performance increase has come with a cost. The chief cost is an increased amount of time to charge the vehicle. Charge times with improved batteries can exceed 36 hours—this is an unsatisfactory length of time for a daily commuter. Also, larger-capacity batteries have come with added weight. As batteries weigh more, the performance of the cars carrying the weight decreases.

SUMMARY OF THE INVENTION

Kirchhoff's Voltage Law states that the algebraic sum of potential difference around a closed circuit is zero.

Electrons always flow from high potential to low potential. Therefore, batteries with high voltage will discharge into and through batteries of lower voltage. So, in a circuit having a first, high-voltage battery connected in series to a second, low-voltage battery, current will flow from the high-potential battery to the low-potential battery until equilibrium between the two batteries is reached. Kirchoff's Voltage Law also teaches that the output of voltage by the high-potential batter equals the input of voltage into the low-potential battery.

This invention applies Kirchoff's laws. A circuit is created with two battery banks, battery bank #1 and battery bank #2. Each battery bank has a plurality of cells connected to each other by a battery relay. Between the battery banks, a load is connected. The battery relay within each battery bank switches the cells within each battery bank from being connected in parallel to each other, to being connected in series with each other.

A ping-pong effect is established by using the previously-described circuit. To create the ping-pong effect, one bank of batteries is switched so its cells are parallel to each other and the other is switched so that its cells are in series with each other. In the bank in series, the voltage for the bank is equal to the sum of the voltage of each cell. In the bank in parallel, the voltage of the entire bank is equal to the average voltage of the individual cells. Once connected, the voltage between the battery banks will equilibrate. Equilibrium is the point at which the total potential of the battery bank in series equals the potential of each of the individual cells of the batteries in the second bank.

As the battery banks equilibrate, current passes from the bank of higher potential to the bank of lower potential. As stated previously, the lines connecting the battery banks have a load placed in series with them. The current flowing during equilibration will then drive this load.

At the point of equilibrium, both battery relays are switched. The battery bank in series is switched to a battery bank in parallel and the battery bank in parallel is switched to the battery bank in series. The potential of the cells in the series bank is summed and will be greater than the potential in each of the cells in parallel. Again, the voltage will transfer until equilibrium. Once equilibrium, is reached, the battery relays are switched and the equilibration process is restarted. In this way, the voltages are said to "ping-pong" back and forth.

Because the battery relays are able to connect batteries in a series or in parallel, the low voltage parallel batteries will be charged as the series batteries discharge through the load, and into the negative post of the parallel bank.

The advantage of such a ping-pong system compared to a bank of batteries in series or a bank of batteries in parallel is that the Electro Motive Force (hereinafter, EMF) is created by the potential of the batteries themselves and the flow of current as equilibrium is achieved. Furthermore, the switching and resultant ping-pong of electrons cause the battery banks to be constantly flowing with current as the banks equilibrate.

The invention also encompasses a cycle relay that works in conjunction with the two, switchable battery banks that comprise the ping-pong system. The cycle relay changes how the current flow in relation to the battery banks. The cycle relay is placed between the two battery banks, opposite of the load.

First, the cycle relay can act to prevent overcharging in a ping pong circuit. As the voltage flows from the high-potential, series battery bank to the low-potential parallel battery bank, the cells in the parallel bank may begin to exceed their maximum charge. This problem occurs most often just after charging when all of the batteries are at their full potential. To prevent overcharging, the cycle relay disconnects both the ingoing and outgoing current to the fully-charged battery bank, effectively creating a circuit comprised by the battery bank that is in series and the load. After the batteries are discharged initially, the cycle relay will switch to include the second battery bank to begin the ping-pong effect.

The cycle relay is capable of switching the power off to either battery bank. In this way, both banks are protected from overcharging regardless of which direction in which the current is ping ponging.

The cycle relay can also be used to configure the battery banks for heavy loads and hill climbing. The cycle relay and battery relays can work in conjunction to switch the battery banks and cells that comprise the battery banks all to parallel to each other. In this configuration, the current is increased. The increase in current is directly proportional to an increase in power. When applied to electric cars, the increase in power is useful in situations such as hill climbing and carrying heavy loads. The increase in power has tradeoffs. In heavily load and hill climbing configuration, no ping-pong effect is created and the batteries therefore discharge faster.

The cycle relay in conjunction with the battery relays can also switch the circuit to emergency power mode. In emergency power mode, the battery banks are parallel to each other while the cells in each battery bank are in series with each other. The voltage across the load in emergency power configuration is twice as much as the voltage created by heavy load and hill climbing configuration. This configuration creates higher power than ping pong mode but not as high power as heavy load and hill climbing mode. The charge does not last as long as it would in ping pong mode.

A further configuration of the cycle relay is to place all of the batteries in parallel with each other for charging. Once all of the batteries are connected an exterior power source is connected (either physically or magnetically) to the circuit. The exterior power source charges the batteries. By having all of the batteries in parallel with each other during charging, the required voltage of the ingoing line is minimized.

A flow relay can also be included in the circuit. The flow relay is connected across the load. The flow relay guarantees that the flow of current through the load is in the same direction regardless of the direction of the ping-pong effect.

The benefits from this invention will be better understood from a description of certain embodiments of this invention that follows.

DETAILED DESCRIPTION OF THE PREFERRED EMBODIMENTS

The details of a preferred embodiment of this invention will be better understood in the light of a description thereof that follows, particularly when the reader follows the set of drawing that forms part of this description.

In its preferred embodiment, the invention encompasses an apparatus for utilizing current flow from a high potential to a low potential for powering a load such as an electric motor in an electric car or cart.

Figure 1:
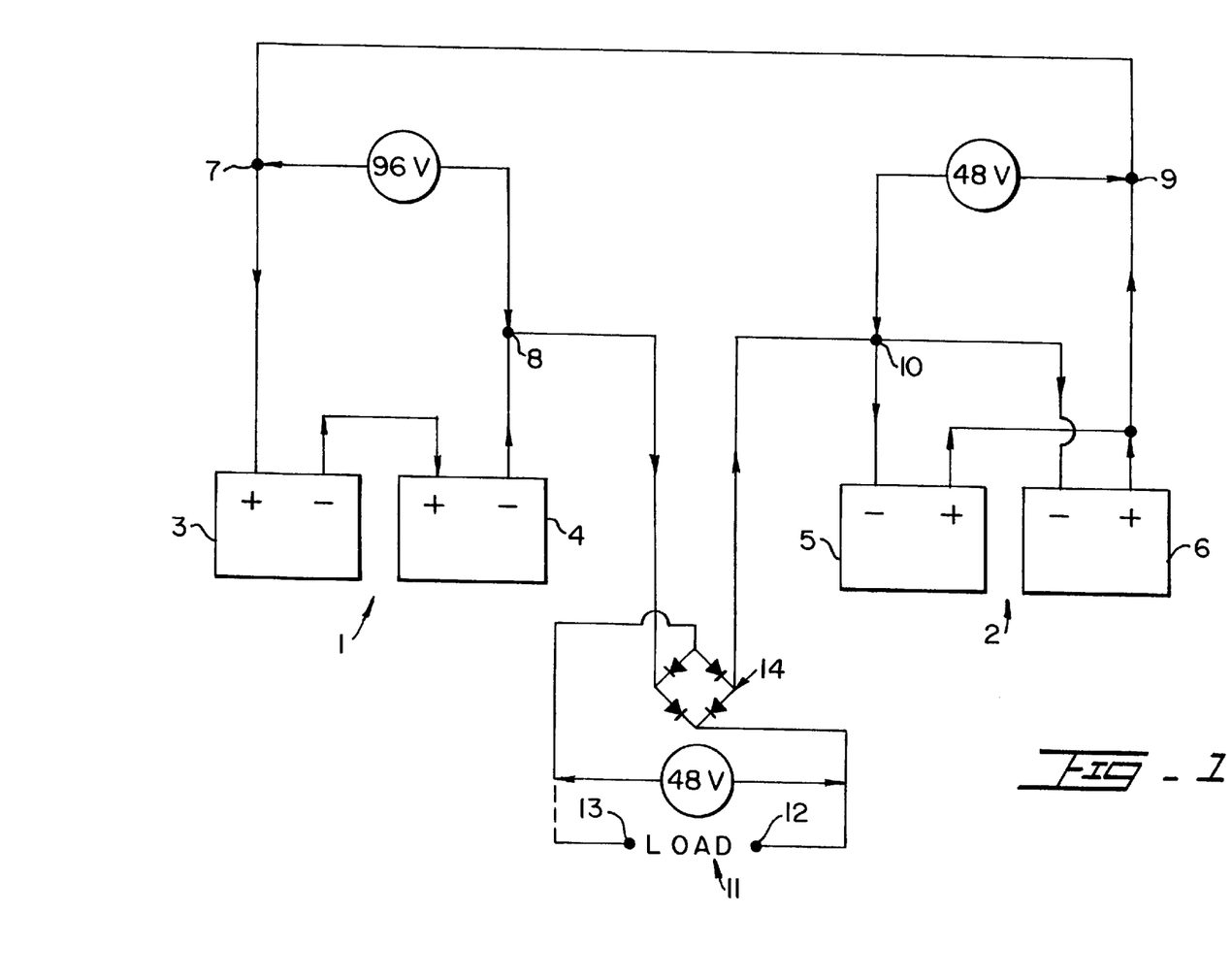
FIG. 1 is a circuit diagram of an embodiment not including a cycle relay switch or battery relay switch.

The apparatus has a first bank of batteries 1 and a second bank of batteries 2. The batteries are typical batteries that store energy and may be wet or dry or portable, including typical automobile batteries. Each bank of batteries contains a plurality of batteries, a preferred embodiment uses three batteries in each bank. Bank 1 has batteries 3 and 4; bank 2 has batteries 5 and 6. Each battery has a positive and negative terminal. The batteries within each bank are electrically connected at their positive and negative terminals to other batteries within each bank. As shown in FIG. 1, batteries 3 and 4 of bank 1 are connected in series, and batteries 5 and 6 are connected in parallel. Therefore, bank 1 has a positive terminal 7 and a negative terminal 8. Likewise, bank 2 has a positive terminal 9 and a negative terminal 10. The voltage potential across bank 1, shown in series, is 2× the battery voltage of one battery when all batteries are the same size. The voltage potential across bank 2 is 1× the battery voltage of one battery. If the batteries are 48 volts each, then bank 1 has a voltage potential of 96 volts and bank 2 of 48 volts. The potential voltage difference between the terminals of bank 1 and bank 2 when connected is 48 volts.

A load 11, having output terminals 12 and 13, is connected to the negative terminals 10 and 8 of said battery banks. In the circuitry connecting said load to said terminals is a Wheatstone bridge 14. Said bridge 14 includes 4 current diodes limiting the current direction as shown.

The positive terminals 7 and 9 of said banks are directly connected to complete the circuit. The voltage potential across the load and which drives the load is the voltage difference between the voltage of the two banks, e.g., 96 volts (bank 1)–48 volts (bank 2)=48 volts (across the load at terminals 12 and 13).

Battery relay switches 15 and 16 are used to connect the batteries within each bank. Said switches 15 and 16 are constructed and arranged to switchably connect the batteries in each bank in parallel arrangement or series arrangement.

The battery relay switches 15 and 16 connect the batteries within said banks of batteries 1 and 2 to all said batteries, e.g. 3 and 4, being parallel to each other or all said batteries being in series with each other. In either configuration, the output terminals of each bank of batteries remain positive, terminals 7 and 9, and negative, terminal 8 and 10.

A controller, such as a computer, controls battery relay switches 15 and 16 to alternate the connection of the batteries within each said bank 1 and 2 from a parallel arrangement to a series arrangement, whenever the voltage potential difference between banks 1 and 2 approaches zero or is at zero. By switching the arrangement of the batteries from parallel to serial and serial to parallel of each said bank, a new potential difference is created as the bank arranged in series will have a higher voltage than the bank arranged in parallel. In this way, current will flow back and forth from bank 1 to bank 2 until the load 11 has drained batteries 3, 4, 5, and 6.

Figure 3:
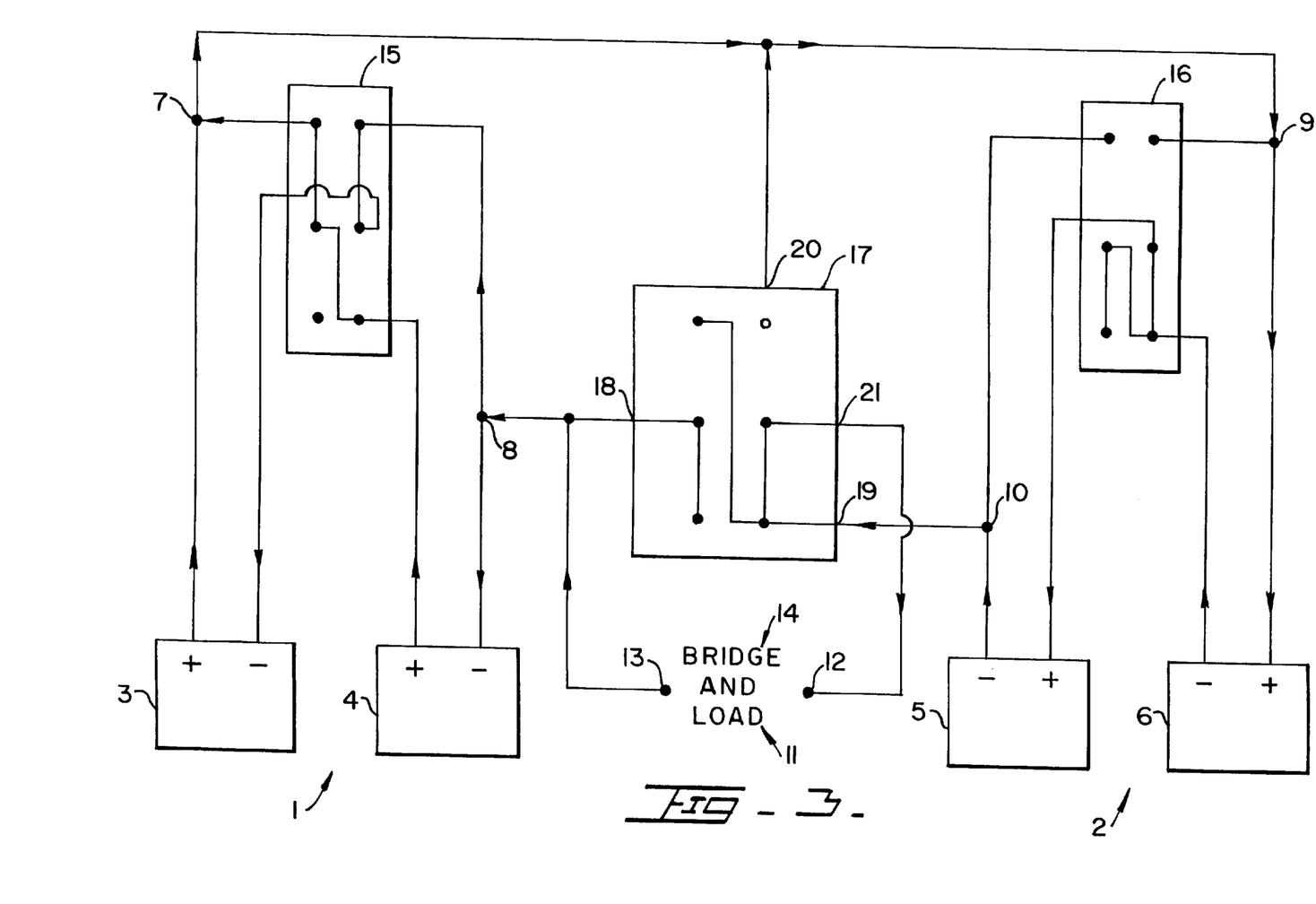
FIG. 3 is a circuit diagram of the preferred embodiment wherein the batteries of a first bank are in series making that bank have a higher potential, and the batteries of a second bank are in parallel making that bank have a lower potential.
Figure 4:
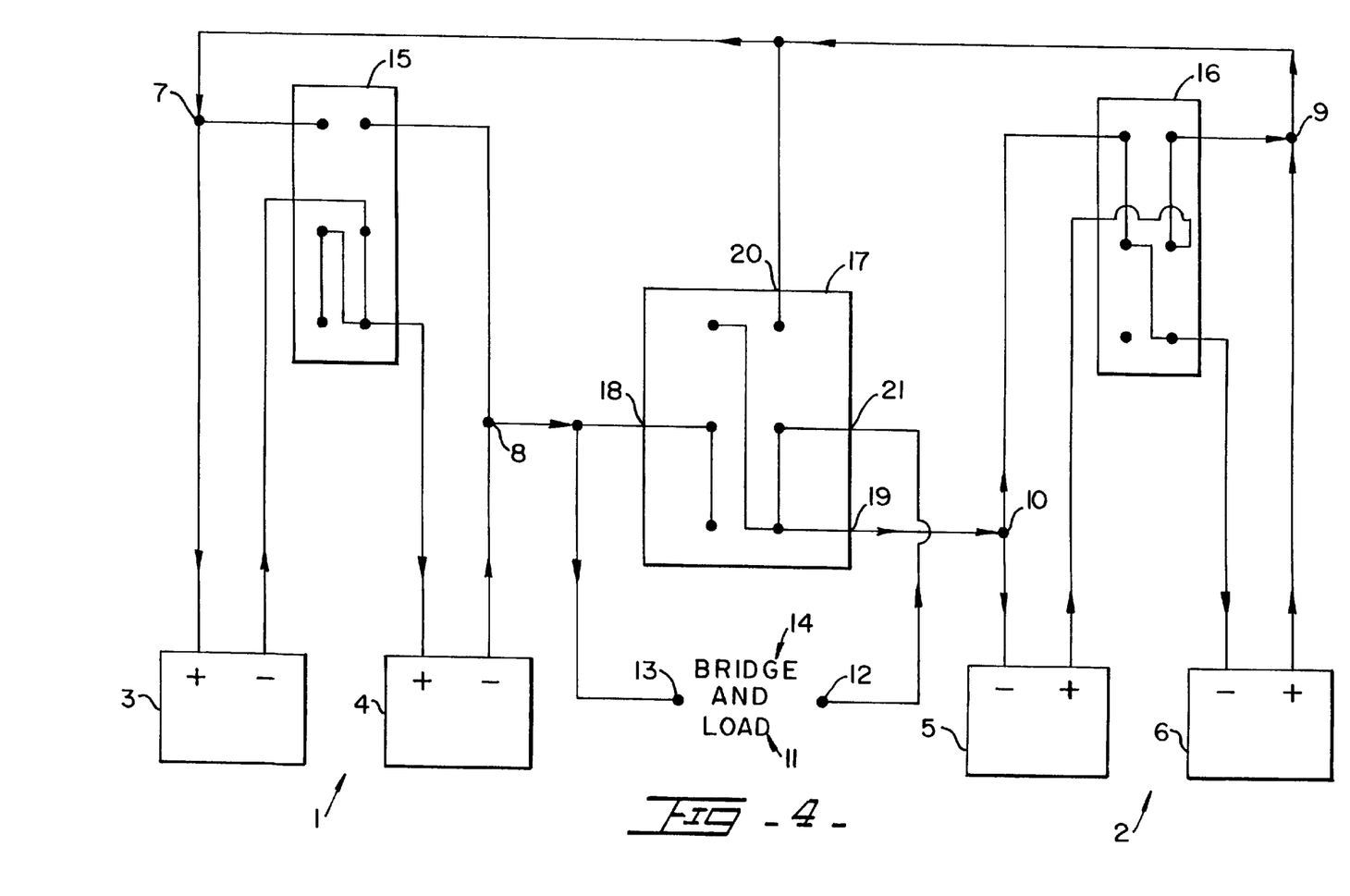
FIG. 4 shows an inverse of FIG. 3 where the arrangement of the batteries each bank have been switched compared to FIG. 3, parallel to serial and serial to parallel.

In FIGS. 3 and 4, the change in the arrangement of batteries 3 and 4 in bank 1 and the batteries 5 and 6 in bank 2 and the corresponding change in current direction is shown.

In FIG. 3, bank 2 is arranged in series and bank 1 is arranged in parallel. Bank 2 has a higher potential than bank 1. The current flows from bank 2, through negative terminal 10 of bank 2, across load 11, through negative terminal 8 of bank 1, into batteries 3 and 4, through positive terminal 7 of bank 1, to positive terminal 9 of bank 2.

In FIG. 4, the arrangement of batteries 3, 4, 5, and 6 is alternated by batter relay switches from the arrangement in FIG. 3; the batteries 3 and 4 in bank 1 are in series with each other and batteries 5 and 6 in bank 2 are parallel to each other. Bank 1 has a higher potential than bank 2 and as a result the current runs from bank 1 to bank 2. The current runs from batteries 3 and 4 of bank 1, through negative terminal 8 of bank 1, across load 11, through negative terminal 10 of bank 2, though batteries 5 and 6 of bank 2, through positive terminal 9 of bank 2, through positive terminal 7 of bank1, into batteries 3 and 4 of bank 1. The current flows in the direction until the potential difference between bank 1 and 2 approaches zero.

The preferred embodiment also includes a cycle relay 17 which contains four switches 18, 19, 20, and 21. A first switch 18 connects negative terminal 8 and cycle relay 17. A second switch 19 connects negative terminal 10 and cycle relay 17. Positive terminals 7 and 9 and cycle relay 17 are connected to each other along a common bus. Third switch 20 connects the positive terminals 7 and 9 to cycle relay 17. Fourth switch 21 connects one side of load 12 to cycle relay 17. The other side of load 13 is connected to negative terminal 8 of bank 1.

Cycle relay 17 has several positions in which switches 18, 19, 20, and 21 are changed to optimize battery performance.

FIGS. 3 and 4 show cycle relay switch 17 in its normal operating position. Switches 18, 19, 20 and 21 are set to simulate a circuit simulate to the circuit shown in FIG. 1 that has no cycle relay switch. In FIGS. 3 and 4, cycle relay switch is positioned with switches 18 and 20 open; switch 19 is connected electrically to switch 21. Under normal operation, cycle relay switch 17 does not change regardless of the direction that the current flows.

Figure 2:
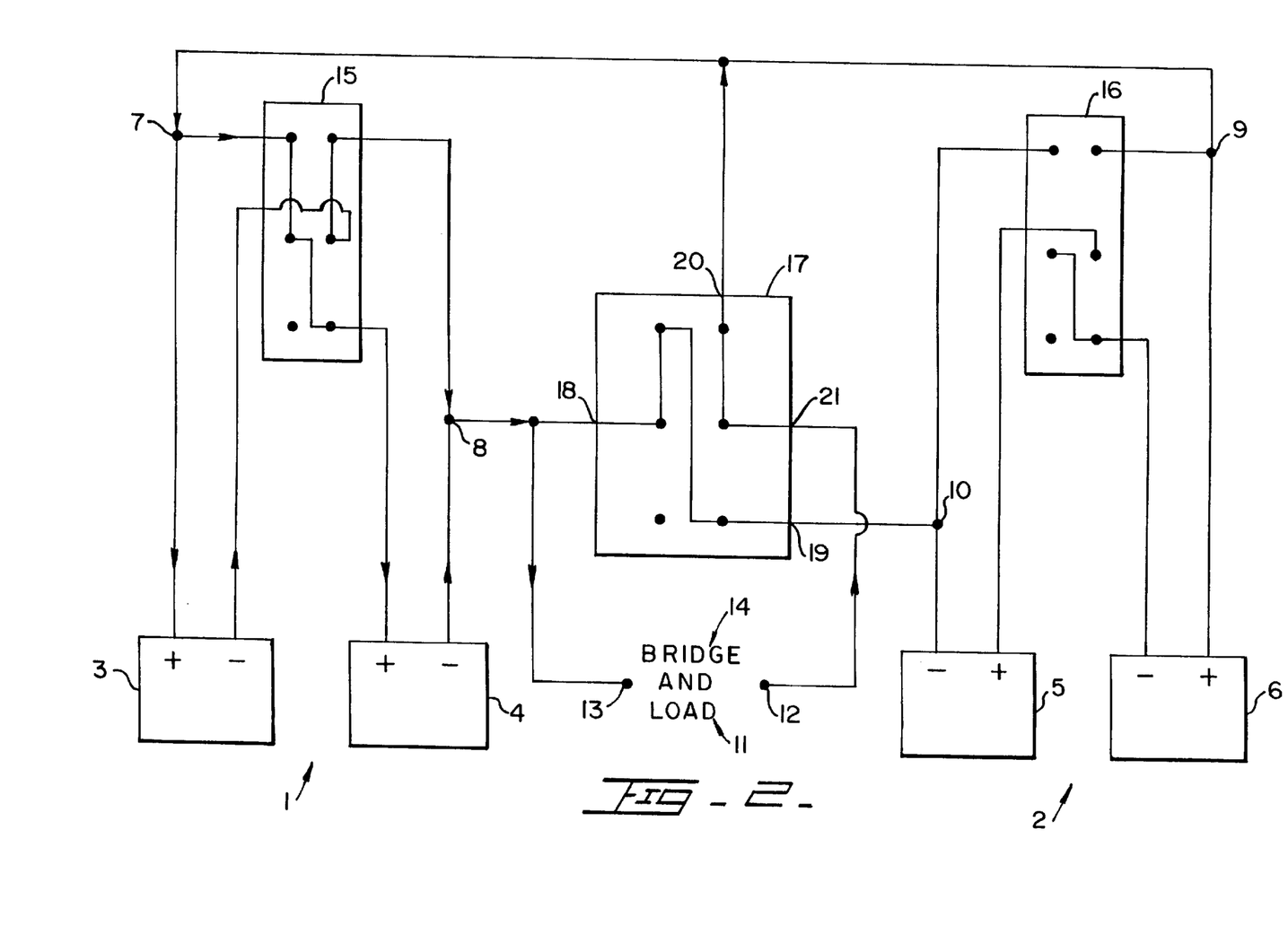
FIG. 2 is a circuit diagram of the preferred embodiment where one of the battery banks is off and the load is being driven by the other bank only.

FIG. 2 shows cycle relay 17 and switches 18, 19, 20, and 21 at startup, when batteries 3, 4, 5, and 6 are fully-charged. Because the batteries 3, 4, 5, and 6 are fully charged any more charging will cause them to become overcharged. To prevent overcharging, one of the banks 2 is switched off and load 11 is driven in a conventional manner by bank 1. To accomplish this, cycle relay 17 is moved to a position where switch 21 is connected to switch 20. Battery relay switch 16 is opened to disconnect batteries 5 and 6. This configuration allows current to run from bank 1, through negative terminal 8, through load 11, through the connection between switch 21 and switch 20 to the positive terminal 7 of bank 1. Bank 2 receives no current.

Under normal conditions, cycle relay switch 17 does not affect the above-described configuration. As seen in FIG. 2 and 3, cycle relay switch 17 remains constant while battery relay switches 15 and 16 alternate the batteries arrangement within each bank 1 and 2 from parallel to serial and serial to parallel. In its normal operating position, cycle relay switch 17 is in a position where bank 2 discharges through load 18 and charges bank 1. In this position, cycle relay 17 connects switch 19 to switch 21, and opens switch 18 and 20. This position allows current to flow from higher potential bank 2 to the lower potential bank 1. The current flows from negative terminal 10 of bank 2 through switch 19 which is connected to switch 21, through load 11, to negative terminal 8 of bank 1; the circuit is completed by connected positive terminal 7 of bank 1 to positive terminal 9 of bank 2. As stated, the potential difference between bank 1 and bank 2 creates the current. To maximize the potential difference between the banks, the batteries 5 and 6 in bank 2 connected in series by battery relay switch 8; the batteries 3 and 4 in bank 1 are switched by battery relay switch 7 so that batteries 3 and 4 are parallel to each other. Current will continue to flow from bank 2 to bank 1 until banks 1 and 2 have no voltage potential difference between them.

Figure 5:
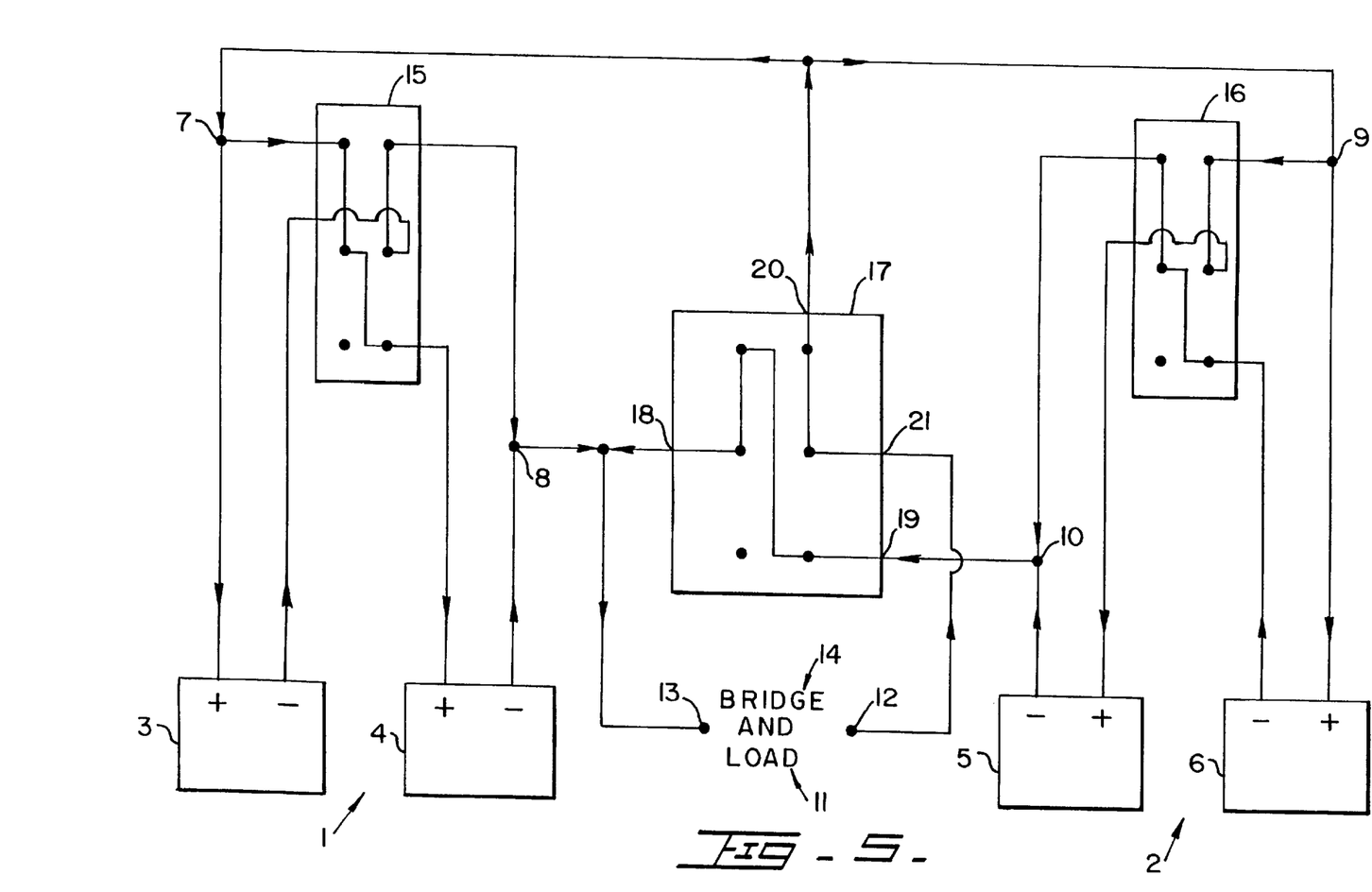
FIG. 5 is a circuit diagram showing the batteries in both banks in parallel with each other.

In FIG. 5, the circuit relay switch 17 is in heavy load and hill climbing mode. In this configuration, battery relay 15 has switched the cells in battery bank 1 to be parallel with each other. Battery relay 16 has switched the cells in battery bank #2 to be in parallel with each other. The circuit relay switch 17 is switched so that battery banks 1 and 2 are parallel to each other.

Figure 6:
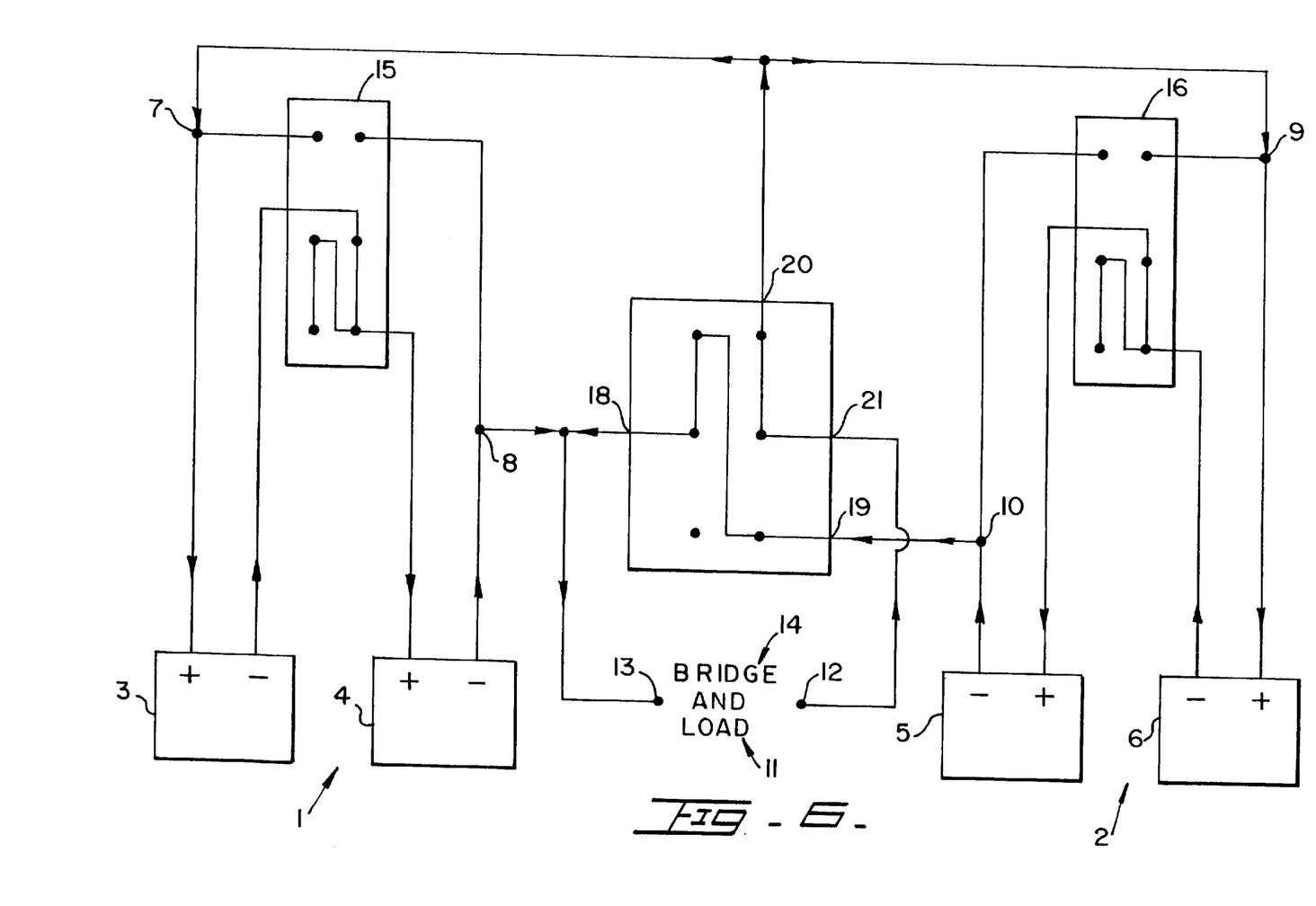
FIG. 6 is a circuit diagram showing the batteries in both banks in series with each other and each bank in parallel with each other.

In FIG. 6, the circuit relay switch 17 is configured for emergency power. Battery relay switch 15 switched the batteries 3 and 4 in battery bank 1 so that they are in series with each other. Battery relay switch 16 switches the cells in battery bank 2 so that they are in series. The cycle relay switch 17 switches the current so battery bank 1 is parallel to battery bank 2.

Applicant has conformed to the requirements of the patent statutes by describing and illustrating what he considers to be the best embodiments of this invention. However, it is understood that various modifications within the scope of the claimed subject matter that follows may be made without departing from the gist of this invention.

What is claimed is:

1. An apparatus for utilizing current flow from a high potential to a low potential for powering a load such as an electric motor comprising:

a first bank of batteries connected to a second bank of batteries, each said bank of batteries constructed and arranged such that each battery within said bank of batteries is electrically connected to another battery within said bank of batteries, each said bank having positive and negative output terminals, such that a voltage potential exists between the output terminals of one of said bank of batteries and the other said bank of batteries created by the difference in voltage between one of said banks of batteries and the other said bank of batteries, means for electrically connecting a load, that responds to a voltage potential, between the like polarity terminals of said first bank and said second bank, and connecting the opposite set of like polarity terminals of each said bank to each other, a battery relay switch within each said bank of batteries to change the electrical connections of said batteries within each said bank from being connected in either series with each other to being connected in parallel with each other, or from parallel with each other to being connected in series with each other, and a means for operating said battery relay switch of said first bank of batteries and said battery relay switch of said second bank of batteries, such that the connections of said batteries within said each bank are simultaneously switched back and forth to alternately create a higher voltage potential in one said bank with a lower voltage potential in the other said bank.

2. An apparatus for utilizing current flow from a high potential to a low potential for powering a load such as an electric motor comprising:

a first bank of batteries connected to a second bank of batteries, each said bank of batteries constructed and arranged such that each battery within said bank of batteries is electrically connected to another battery within said bank of batteries, each said bank having positive and negative output terminals, such that a voltage potential exists between the output terminals of one of said bank of batteries and the other said bank of batteries created by the difference in voltage between one of said banks of batteries and the other said bank of batteries, means for electrically connecting a load, that responds to a voltage potential, between the like polarity terminals of said first bank and said second bank, and connecting the opposite set of like polarity terminals of each said bank to each other, wherein the batteries in one of the banks are parallel to each other, and the batteries in the other bank are in series with each other.

3. A circuit described in claim 2, further comprising:

a flow relay connected to both sides of said load, that causes the current that may be flowing from either bank to flow through the load in a single direction.

4. A circuit described in claim 3, wherein said cycle relay prevents overcharging batteries by moving said switches to prevent current from entering the fully charged batteries in the low potential bank by:

disconnecting the switch between the load and low potential bank, and connecting the now unconnected side of the load to the third switch, so that the low potential bank receives no current while a circuit is completed by the high potential bank and the load.

5. A circuit described in claim 3:

wherein said cycle relay switches said banks so that they are parallel to each other by switching the connection so that both positive terminals connect to each other before they connect to a first side of the load, and both negative terminal connect to each other before connecting to the other side of the load, and wherein said cycle relay works in conjunction with said battery relays so that said battery relays switch the cells in said banks to parallel.

6. A circuit as described in claim 3, wherein said cycle relay switches said banks so they are in series with each other, by switching the connection between the cells so that the positive terminal of the first bank is connected to the negative terminal of the second bank, and the negative terminal of the second bank is connected to the first side of the load, and the second side of the load is connected to the positive terminal of the first bank, and wherein said cycle relay works in conjunction with the battery relays to switch the cells in said banks to being in series with each other.

7. A circuit as described in claim 3, wherein the switches are all closed so that current flows from a terminal of the high potential bank through the electric motor to a like polarity terminal of the low potential bank and the other like polarity terminals of each bank are connected to each other.

8. An apparatus for utilizing current flow from a high potential to a low potential for powering a load such as an electric motor comprising:

a first bank of batteries connected to a second bank of batteries, each said bank of batteries constructed and arranged such that each battery within said bank of batteries is electrically connected to another battery within said bank of batteries, each said bank having positive and negative output terminals, such that a voltage potential exists between the output terminals of one of said bank of batteries and the other said bank of batteries created by the difference in voltage between one of said banks of batteries and the other said bank of batteries, means for electrically connecting a load, that responds to a voltage potential, between the like polarity terminals of said first bank and said second bank, and connecting the opposite set of like polarity terminals of each said bank to each other, a switch that changes each bank to the opposite position, parallel to serial and serial to parallel, upon reaching equilibrium in order to create repeatedly a new potential difference between said banks.

9. An apparatus for utilizing current flow from a high potential to a low potential for powering a load such as an electric motor comprising:

a first bank of batteries connected to a second bank of batteries, each said bank of batteries constructed and arranged such that each battery within said bank of batteries is electrically connected to another battery within said bank of batteries, each said bank having positive and negative output terminals, such that a voltage potential exists between the output terminals of one of said bank of batteries and the other said bank of batteries created by the difference in voltage between one of said banks of batteries and the other said bank of batteries, means for electrically connecting a load, that responds to a voltage potential, between the like polarity terminals of said first bank and said second bank, and connecting the opposite set of like polarity terminals of each said bank to each other, a cycle relay having three switches:
a first switch located in the connection between a bank and the load,
a second switch located in the connection between the other bank and the load, and
a third switch is connected to the middle of the connection between said banks not containing said load.

* * * * *